(12) United States Patent
Lin et al.

(10) Patent No.: US 10,495,863 B2
(45) Date of Patent: Dec. 3, 2019

(54) PORTABLE MICROSCOPE DEVICE

(71) Applicant: Aidmics Biotechnology Co., Ltd., New Taipei (TW)

(72) Inventors: Shu-Sheng Lin, New Taipei (TW); Cheng-Ming Lin, New Taipei (TW); Chang-Yu Chen, New Taipei (TW); Tsun-Chao Chiang, New Taipei (TW)

(73) Assignee: AIDMICS BIOTECHNOLOGY CO., LTD., New Taipei (TW)

( * ) Notice: Subject to any disclaimer, the term of this patent is extended or adjusted under 35 U.S.C. 154(b) by 26 days.

(21) Appl. No.: 14/793,267

(22) Filed: Jul. 7, 2015

(65) Prior Publication Data

US 2016/0004057 A1   Jan. 7, 2016

(30) Foreign Application Priority Data

Jul. 7, 2014   (TW) .............................. 103123319 A

(51) Int. Cl.
*G02B 21/00* (2006.01)

(52) U.S. Cl.
CPC ................ *G02B 21/0008* (2013.01)

(58) Field of Classification Search
CPC .... G02B 21/02; G02B 21/0008; G02B 21/26; G02B 21/34; G02B 21/16; G02B 21/06; G02B 21/362; G02B 21/0092
USPC .......... 359/363, 368, 377, 389, 391
See application file for complete search history.

(56) References Cited

U.S. PATENT DOCUMENTS

| | | | | |
|---|---|---|---|---|
| 5,062,697 | A | * | 11/1991 | Mitchell ............ G02B 21/0008 359/379 |
| 5,815,311 | A | * | 9/1998 | Ishikawa .................. G02B 7/14 359/381 |
| 6,847,480 | B2 | * | 1/2005 | Steenblik ........... G02B 21/0008 359/368 |
| 8,184,366 | B2 | | 5/2012 | Liang |
| 2001/0010591 | A1 | * | 8/2001 | Kusaka .................... G01B 9/04 359/371 |
| 2002/0044347 | A1 | | 4/2002 | Steenblik et al. |
| 2004/0207937 | A1 | * | 10/2004 | Engelhardt .......... G02B 21/248 359/821 |
| 2005/0196857 | A1 | * | 9/2005 | Lee ........................ G02B 21/34 435/292.1 |
| 2007/0053569 | A1 | * | 3/2007 | Douglass ............... G01N 1/312 382/128 |

(Continued)

FOREIGN PATENT DOCUMENTS

| | | | | |
|---|---|---|---|---|
| CN | 201508433 | | 6/2010 | |
| CN | 202886724 | * | 4/2013 | ............. G02B 21/02 |

(Continued)

*Primary Examiner* — Stephone B Allen
*Assistant Examiner* — Rahman Abdur
(74) *Attorney, Agent, or Firm* — Muncy, Geissler, Olds & Lowe, P.C.

(57) ABSTRACT

The present invention discloses a portable microscope device which can be installed on the smartphone capable of capturing image. By combing these devices, users can observe the detection sample and capture the image of the sample instantly without environment limitation. Moreover, during operation, the user can observe the whole image of the sample by substituting the microscope lens of different magnification ratio or by shifting the position of the sample.

19 Claims, 13 Drawing Sheets

(56) References Cited

U.S. PATENT DOCUMENTS

| | | | | |
|---|---|---|---|---|
| 2007/0236785 A1* | 10/2007 | Matsumoto | ............ | G02B 21/125 |
| | | | | 359/381 |
| 2008/0151368 A1* | 6/2008 | Weiss | .................... | G02B 21/06 |
| | | | | 359/390 |
| 2011/0268434 A1* | 11/2011 | Knoedgen | ................ | G03B 3/10 |
| | | | | 396/439 |
| 2012/0157160 A1 | 6/2012 | Ozcan et al. | | |
| 2013/0016963 A1* | 1/2013 | Miller | .................. | G02B 21/362 |
| | | | | 396/428 |
| 2013/0278922 A1* | 10/2013 | Gelernt | ................ | G02B 21/16 |
| | | | | 356/51 |
| 2013/0286474 A1* | 10/2013 | Kitahara | ................ | G02B 21/24 |
| | | | | 359/381 |
| 2014/0120982 A1* | 5/2014 | Fletcher | ............ | G02B 21/0008 |
| | | | | 455/556.1 |

FOREIGN PATENT DOCUMENTS

| | | | |
|---|---|---|---|
| CN | 203149189 | | 8/2013 |
| CN | 203365797 | | 12/2013 |
| CN | 203365797 U | * | 12/2013 |
| CN | 205049811 U | | 2/2016 |
| TW | M357612 | | 5/2009 |
| TW | I362556 | | 4/2012 |
| TW | M444520 | | 1/2013 |

\* cited by examiner

PORTABLE MICROSCOPE DEVICE

CROSS REFERENCE TO RELATED APPLICATIONS

This Non-provisional application claims priority under 35 U.S.C. § 119(a) on Patent Application No(s). 103123319 filed in Taiwan, Republic of China on Jul. 7, 2014, the entire contents of which are hereby incorporated by reference.

BACKGROUND

Technical Field

The invention relates to a portable microscope device, in particular to a portable microscope device which is able to cooperate with a communication device.

Related Art

Generally, conventional microscopes are utilized to observe the tiny structure of microorganism, cell or substance. The ordinary microscope generally refers to optical microscope, which uses lenses to enlarge the objective image to the eye or the imaging apparatus. Its resolution is about 1 micro meter, and thus the object in cell size is observable. The optical microscopes are classified into upright microscope, inverted microscope, stereo microscope, etc. based on different designs. The volume of the above conventional microscope is generally large and the user is a specialist in the specific field (biology field, chemical field or related field). To utilize the microscope more conveniently, the miniaturization the conventional microscope has been developed. Some compact microscope even can cooperate with the mobile phone having camera. Referring to US patent publication No. US20120157160 "Compact wide-field fluorescent imaging on a mobile device" (hereinafter the US publication), the US publication discloses an imaging device of a mobile device which has a fluorescent imaging device. The fluorescent imaging device has a lens, and a gripping element is installed on its bottom. The gripping element can grip a mobile device (for example mobile phone or tablet computer, etc.). A detection sample can be disposed in a space of the fluorescent imaging device, and thus the user can observe the detection sample by the capturing camera lens of the mobile device. Accordingly, the US publication minimizes the conventional microscope. Moreover, it is convenient to use the microscope since the mobile device is popular and the minimized microscope can cooperate with it. Other references are also listed below:

(1) TW patent No. 1362556 "MICROSCOPY CONNECTER FOR DOCUMENT CAMERA";
(2) TW patent No. M357612 "Multi-functional microscope device";
(3) TW patent No. M444520 "Lightweight high-power microscopic magnifier lens";
(4) CN patent application No. 201220163127.1 "Palm digital microscope based on intelligent handset";
(5) CN patent application No. 201320060713.8 "Mobile phone external optical device";
(6) CN patent application No. 201320295925.4 "Device for fixing smart phone on microscope or telescope to realize digital photography";
(7) CN patent application No. 200920005757.4 "Multi-functional microscope device";
(8) U.S. Pat. No. 8,184,366 "Multi-function microscope device".

From the above references, although the conventional compact microscope can shrink the whole structure for miniaturization and observe the detection sample by the capturing camera lens of the smart communication device (for example mobile phone) the detection sample, the compact microscope and the smart communication device are kept stationary when using the smart communication device. If the detection sample is not disposed at an adequate location, the camera lens of the compact microscope is not located at the optimized observation location to observe. The user can only dispose the detection sample again. These cumbrous procedures are very inconvenient for the user. Moreover, the magnification ratio of the camera lens of the conventional microscope is constant. The user cannot replace the camera lens on demand. Even the camera lens can be replaced, the conventional device cannot keep focal length optimized and cause problems such as blurred image and so on.

SUMMARY

One objective of the invention is to provide a portable microscope device wherein it can cooperate with a communication device, the microscope lens can be replaced on demand, and the position of the sample to be observed can be adjusted on demand during operation.

To achieve the above objective, the portable microscope device includes a base, a cover and a microscope module. The microscope module is installed on the communication device capable of capturing image. A detection sample is disposed on a microscope slide beforehand and covered with a coverslip. Then the microscope slide is supported on the base. The user can capture the real image of the sample by the communication device. During operation, the user can replace the microscope lens of the microscope module on demand and choose the corresponding cover to optimize its focal length. Moreover, the microscope module can move on the cover. After the user moves the detection sample, the communication device can obtain excellent captured image.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
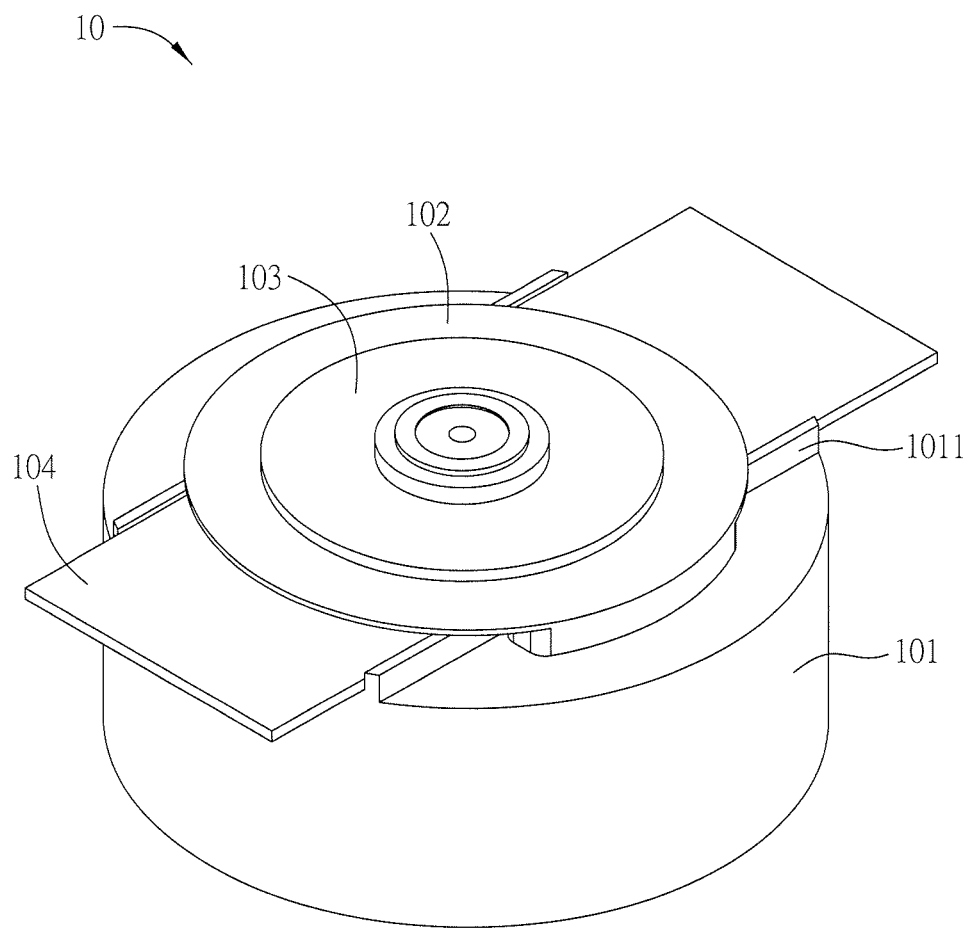
FIG. 1 is a perspective diagram according to the embodiment of the invention.

Referring to FIG. 1, FIG. 1 is a perspective diagram according to the embodiment of the invention. The portable microscope device 10 in FIG. 1 can cooperate with a communication device which is capable of capturing image to capture the real image of a detection sample. The communication device is for example a smart communication device such as a smart phone. The portable microscope device 10 includes a base 101, a cover 102 and a microscope module 103. The base 101 can carry the above components. The base 101 has a restrictive groove 1011 formed on the upper plane thereof. A microscope slide 104 can be disposed in the restrictive groove 1011. Moreover, the base 101 includes an illumination module 105 (referring to FIG. 3). In details, the interior of the base 101 is hollow to accommodate the illumination module 105 and other related circuits. The cover 102 can be movably installed on (for example pivoting, wedging, magnetically connecting) and fixed to the base 101 to keep the focal length of the microscope module 103 optimized. The microscope module 103 has a certain magnification ratio to help the communication device to enlarge the imaging of the detection sample.

Figure 2:
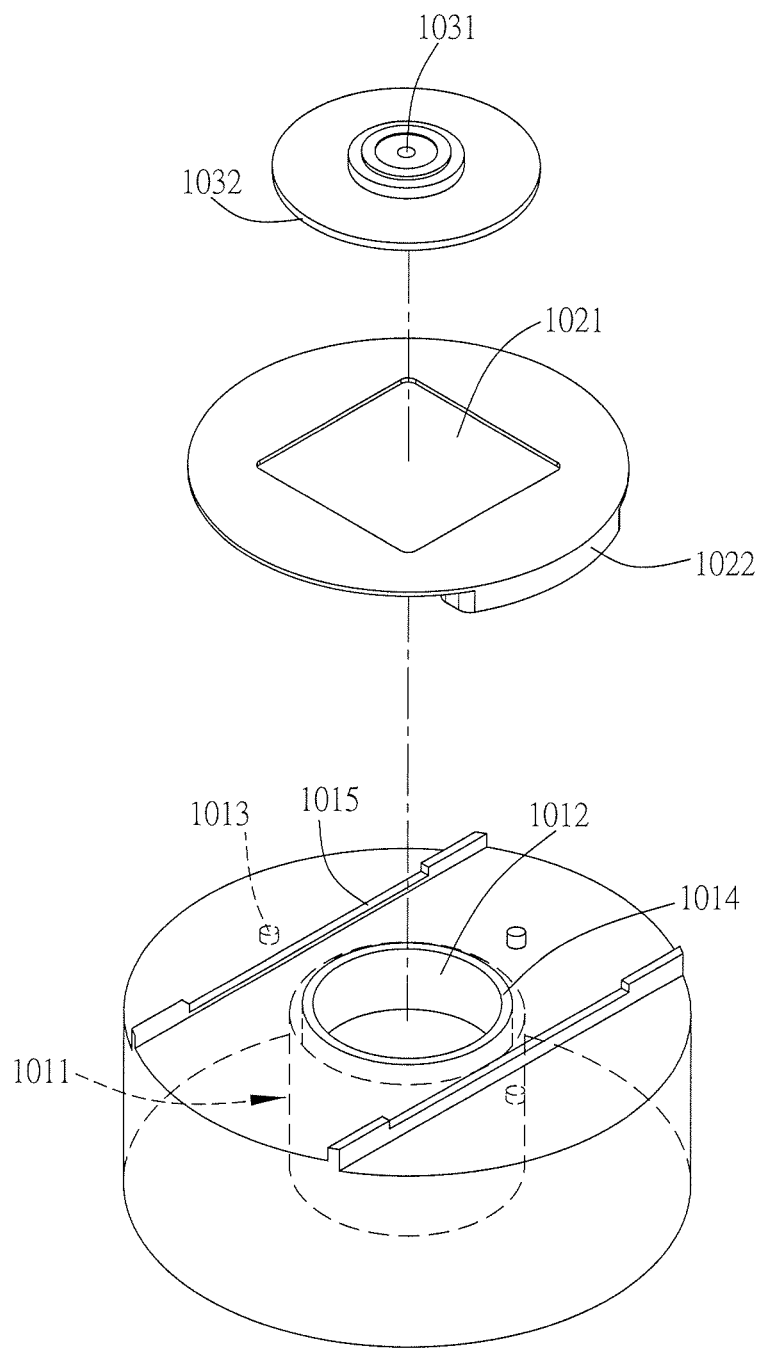
FIG. 2 is a schematic assembling diagram (1) according to the embodiment of the invention.

Referring to FIG. 2, FIG. 2 is a schematic assembling diagram (1) according to the embodiment of the invention. Please also referring to FIG. 1, the base 101 includes a detective portion 1012 on its top and include two assembling portions 1013 respectively at two sides of the restrictive groove 1011. The assembling portion 1013 can be composed of a metal or a magnetic element, but it is not limited thereto. Any implementation enabling the assembling portion 1013 to response to a magnetic force is applicable. Moreover, a magnetic attraction portion 1014 is installed on the periphery of the detective portion 1012. Moreover, the cover 102 is formed with a hollow portion 1021 of which at two sides respectively two relative assembling portions 1022 are extended and formed. The relative assembling portion 1022 can be metal or magnetic material so it and the assembling portion 1013 can be attracted to each other by magnetic force. For example, if the assembling portion 1013 is magnet, the relative assembling portion 1022 can be metal which is attracted to the assembling portion 1013. Alternatively, the relative assembling portion 1022 can attract the assembling portion 1013, or the two are both magnet which attract each other by magnetic force between the two. Furthermore, whole of the microscope module 103 is made of permeance material, a microscope lens 1031 is embedded into the microscope module 103, and the microscope lens 1031 is movably installed on the cover 102. In details, the microscope module 103 includes a relative magnetic attraction portion 1032 at its bottom. During assembling, the microscope slide 104 can be disposed in the restrictive groove 1011 (as shown in FIG. 1) and restricted by the restrictive groove 1011, and then the cover 102 is attracted to the assembling portion 1013 of the base 101 by the relative assembling portion 1022. The cover 102 is fixed to the base 101 by magnetic force so that the hollow portion 1021 of the cover 102 corresponds to the detective portion 1012 of the base 101. Then, when using the microscope module 103, the microscope module 103 can be disposed on the cover 102, the relative magnetic attraction portion 1032 of the microscope module 103 will be attracted to the magnetic attraction portion 1014 of the base 101 so that the microscope module 103 and the cover 102 relatively move under the condition that they are not separated. Accordingly, the microscope lens 1031 is movably installed on the cover 102. In the embodiment, when the portable microscope device 10 cooperates with the communication device, the image capture module of the communication device can capture the image of the detection sample by the microscope lens 103, and its detail will be described later. Besides, in the base 101 of the embodiment, two restrictive portions 1015 are respectively formed at the two sides of the restrictive groove 1011. When the cover 102 is attracted to the base 101, the cover 102 is further embedded into the restrictive portion 1015. Thus, the cover 102 is restricted by the restrictive portion 1015 so as to prevent the cover 102 from sliding during operation.

Figure 3:
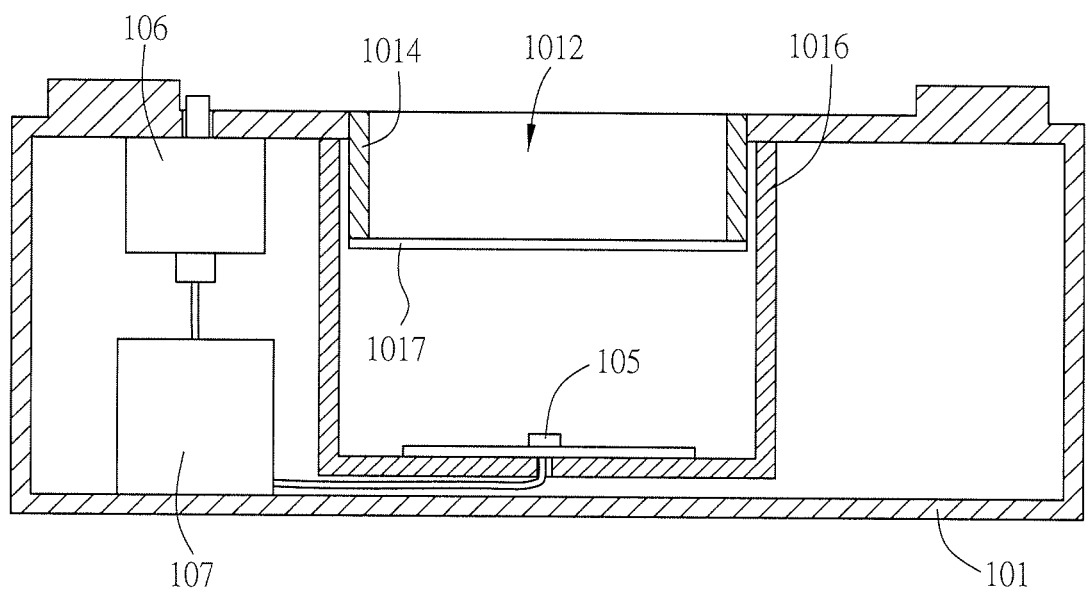
FIG. 3 is a sectional diagram of the base according to the embodiment of the invention.

Referring to FIG. 3, FIG. 3 is a sectional diagram of the base according to the embodiment of the invention. Between the bottom of the base 101 and the detective portion 1012, a ring-shaped retaining wall 1016 is extended and formed. The illumination module 105 is disposed on the bottom of the base 101 and accommodated in the ring-shaped retaining wall 1016, so that the axis of the illumination module 105 is toward the detective portion 1012 to emit an illumination source from the detective portion 1012. Referring to the figure again, a light diffuse element 1017 such as a light diffuse film or a light diffuse plate and so on can be installed above the illumination module 105, so that the illumination source illuminated by the illumination module 105 can uniformly emit out from the detective portion 1012.

In addition, the portable microscope device 10 in the embodiment further includes a switch module 106 and a power module 107. The switch module 106 is installed on the base 101, and it can be for example but not limited to a micro switch, an electronic switch, a piezoelectric switch, a photosensitive switch, etc. The power module 107 is also accommodated in the base 101, and it can output an electric power to drive the illumination module 105 to work. Herein, the power module 107 is electrically connected respectively to the illumination module 105 and the switch module 106, and controlled by the switch module 106. For example, after the switch module 106 is actualized, then the power module 107 can drive the illumination module 105 to work.

Figure 4:
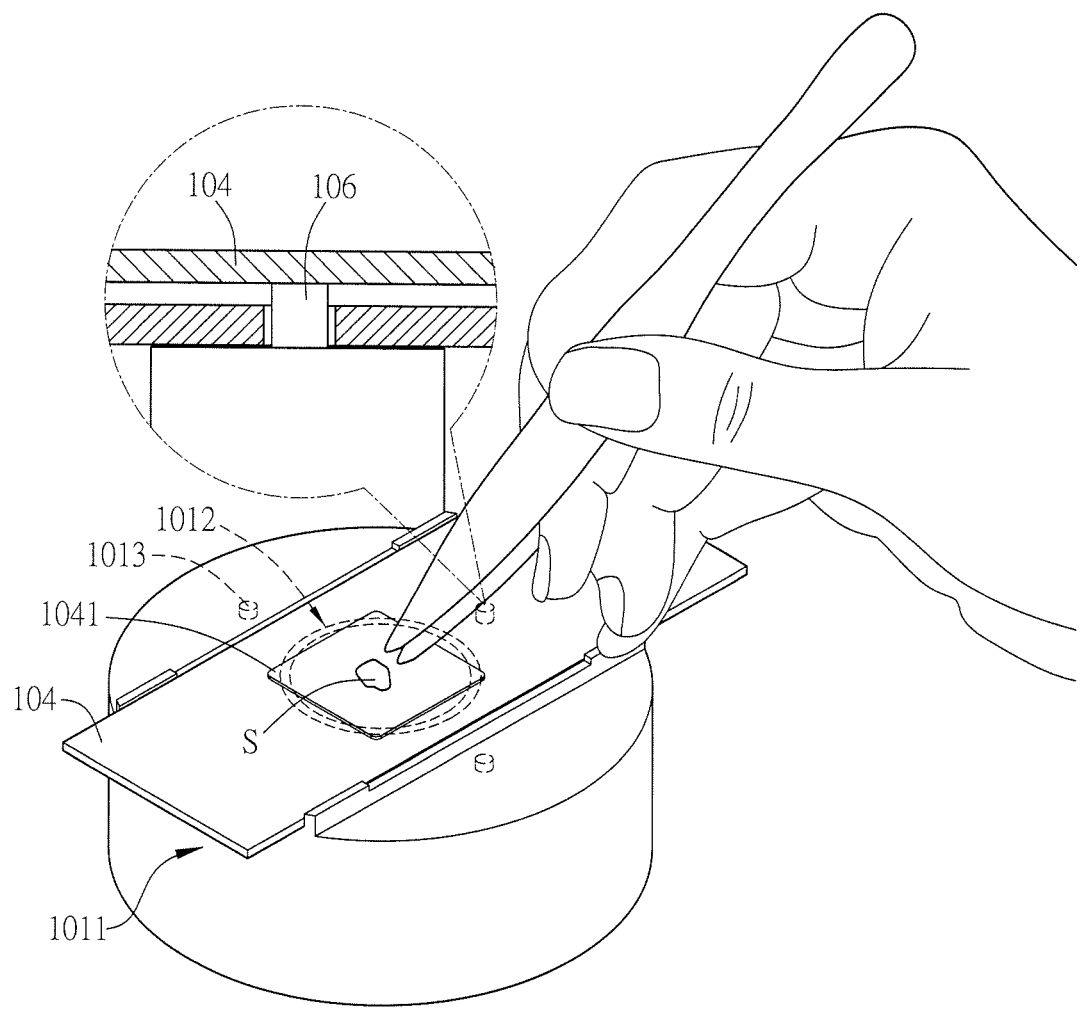
FIG. 4 is a schematic diagram (1) according to the embodiment of the invention.

Referring to FIG. 4, FIG. 4 is a schematic diagram (1) according to the embodiment of the invention. In the embodiment, a user disposes the microscope slide 104 in the restrictive groove 1011 beforehand. At the moment, because the microscope slide 104 is not heavy enough to actualize the switch module 106, the microscope slide 104 is slightly supported by the switch module 106. After the microscope slide 104 is completely disposed, the user can dispose a detection sample S on the microscope slide 104 and then cover it with a coverslip 1041. He may align the microscope slide 104 with the detective portion 1012, or dispose the detection sample S and the coverslip 1041 on the microscope slide 104 before disposing the microscope slide 104, and it is not limited thereto.

Figure 5:
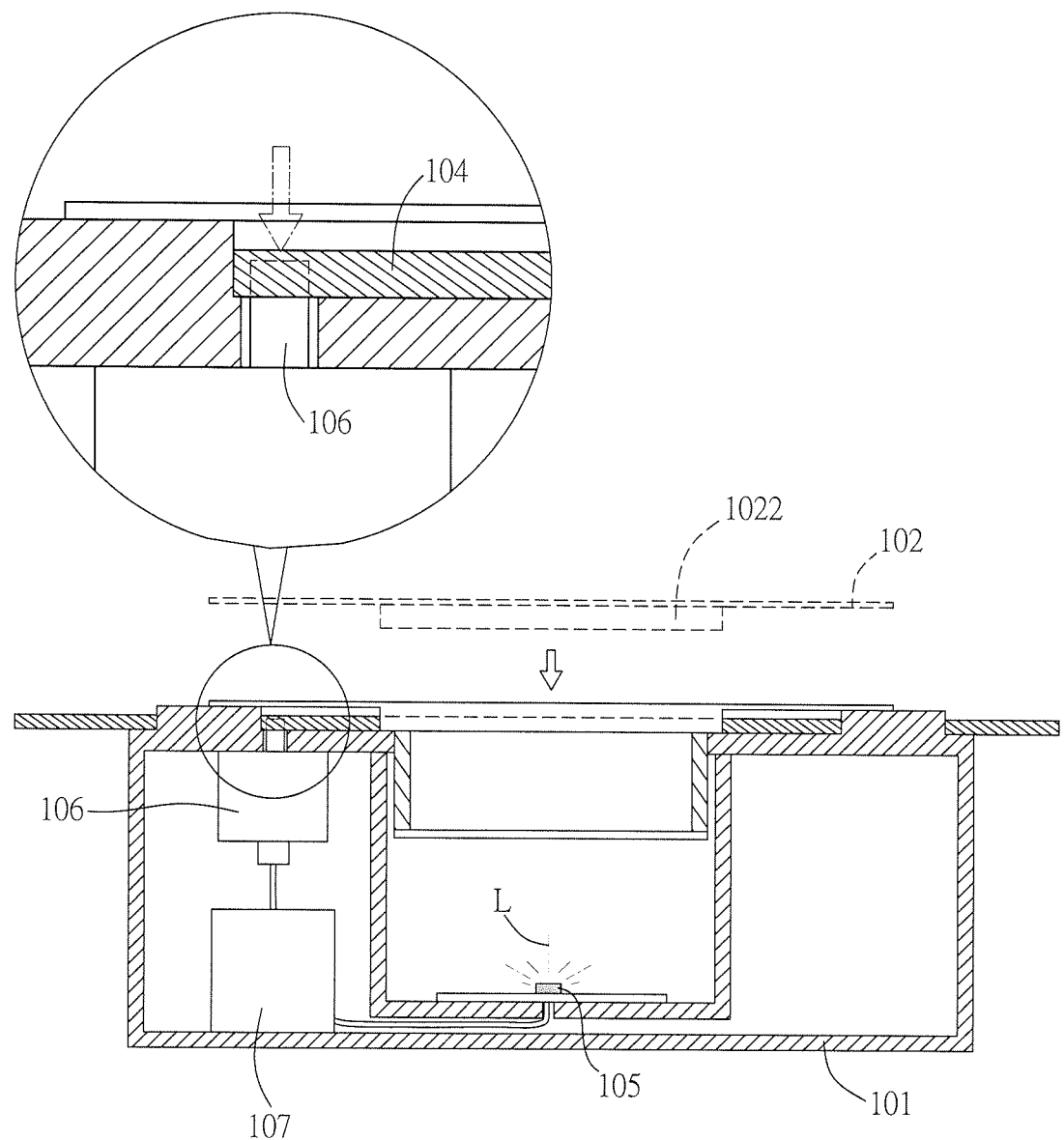
FIG. 5 is a schematic diagram (2) according to the embodiment of the invention.

Referring to FIG. 5, FIG. 5 is a schematic diagram (2) according to the embodiment of the invention. Please also referring to FIG. 4, after disposing the detection sample S, the user can align the relative assembling portion 1022 of the cover 102 with the assembling portion 1013 of the base 101. Thus, the cover 102 is accordingly effected by the magnetic force due to the relative assembling portion 1022 and the assembling portion 1013 (as shown in FIG. 4) to attract the cover 102 to the base 101. Please referring to the figure again, if the cover 102 has been fixed, the hollow portion 1021 of the cover 102 just corresponds to the microscope slide 104 and further corresponds to the detective portion 1012. Moreover, when the cover 102 is attracted to the base 101 by magnetic force, the cover 102 further presses the microscope slide 104 so the microscope slide 104 is tightly stacked on the restrictive groove 1011. Therefore, the microscope slide 104 can actualize the switch module 106 and accordingly the power module 107 drives the illumination module 105 to work and generate an illumination source L. In the embodiment, the illumination module 105 is the illumination source of visible light.

In other embodiments, the illumination module 105 can be the illumination source of invisible light, for example but not limited to the illumination source of infrared rays, the illumination source of ultraviolet or the Raman illumination source. When the illumination module 105 is the illumination source of ultraviolet, the portable microscope device 10 can be applied to fluorescent detection, for example counting detection of biological cell sample. For example, the detection sample can be a sample which contains agent. When ultraviolet provided by the illumination module 105 is irradiated from the detective portion 1012 to the detection sample, at the moment, the agent is excited by ultraviolet to generate fluorescent light for observed by the user. Moreover, when the illumination module 105 is the illumination source of ultraviolet, an ultraviolet cut film can be disposed correspondingly on the microscope module 103 for protecting the user's eyes.

Figure 6:
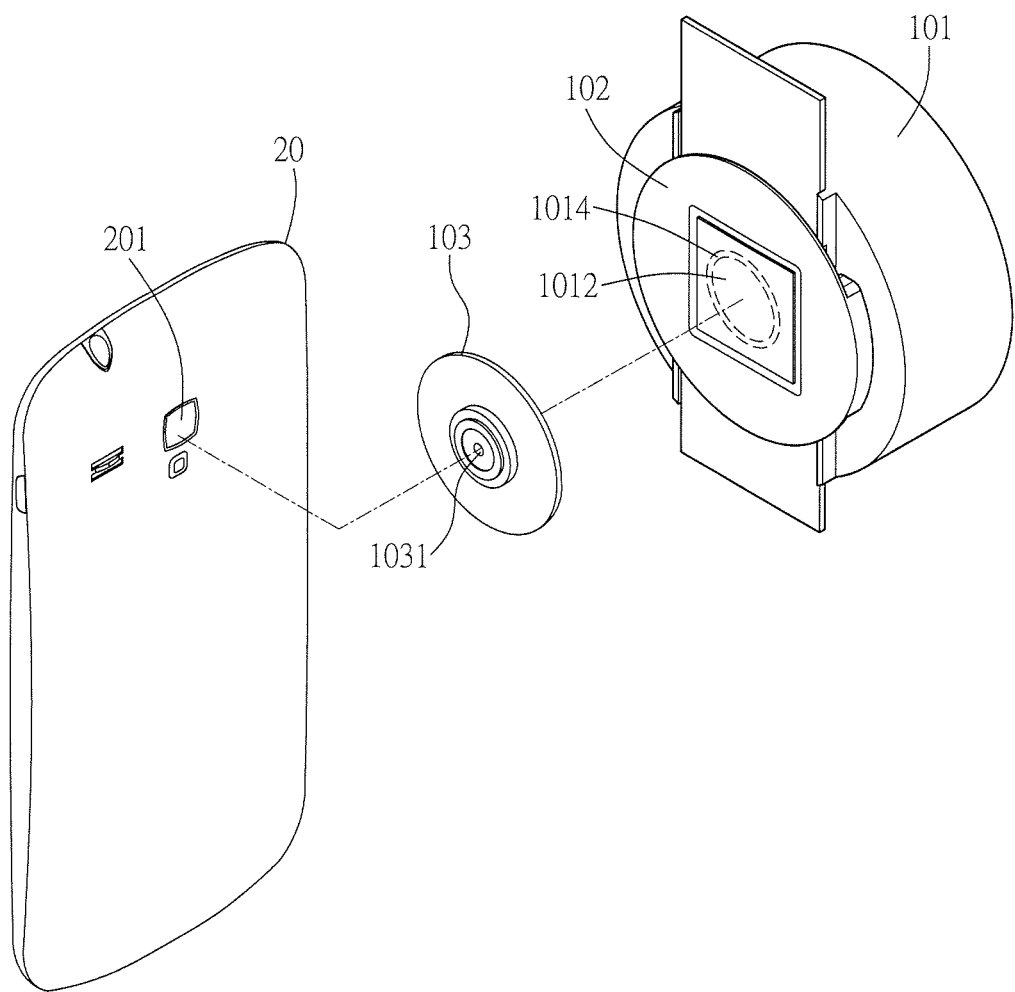
FIG. 6 is a schematic diagram (3) according to the embodiment of the invention.

Referring to FIG. 6, FIG. 6 is a schematic diagram (3) according to the embodiment of the invention. Please also referring to FIG. 5, as to a communication device such as a smart communication device 20 in the figure, when the user want to observe the detection sample S, the user can correspondingly install the microscope lens 1031 of the microscope module 103 on an image capture module 201 of the smart communication device 20. When detecting, the user can attach the microscope module 103 installed on the smart communication device 20 to above the cover 102. Here, the microscope lens 1031 holds an adequate distance with the thickness of the cover 102 so the examinee can be located at the imaging focal plane of the microscope lens 1031 and the distance between the microscope lens 1031 and the examinee can be kept at the optimized focal length. Moreover, when the smart communication device 20 captures the imaging of the detection sample S, the image capture module 201 can clearly capture the imaging of the detection sample S by the illumination source L projected by the detective portion 1012. Moreover, the user can watch the captured imaging on a screen of the smart communication device 20. As mentioned above, the portable microscope device 10 in the embodiment can be applied to not only the observation of the imaging of the detection sample S, but also the observation of the detection sample S having crystallization (for example starch). As long as the sample is birefringent, polarization observation can be performed. If the illumination module 105 is an illumination source of ultraviolet, the portable microscope device can be further applied to fluorescent detection.

Figure 7:
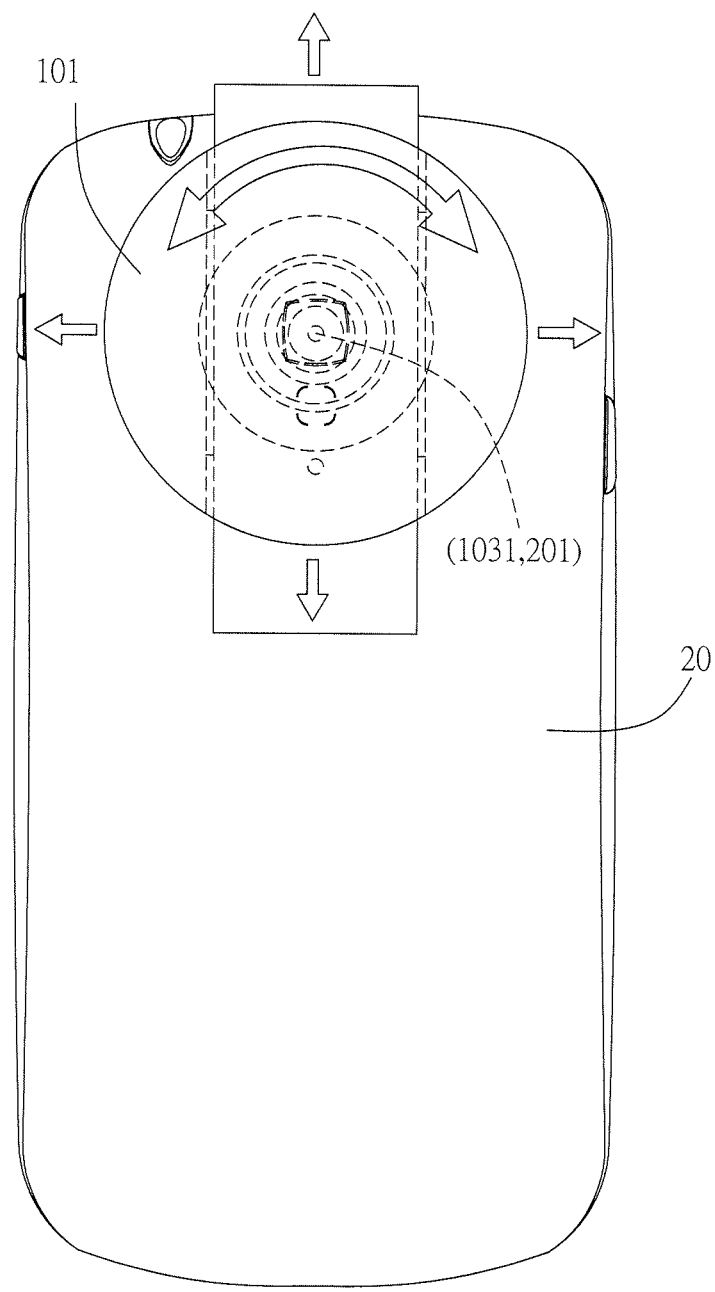
FIG. 7 is a schematic diagram (4) according to the embodiment of the invention.

Referring to FIG. 7, FIG. 7 is a schematic diagram (4) according to the embodiment of the invention. If the detection sample S cannot obtain the whole imaging at the stationary location for capturing, the base 101 and the smart communication device 20 can be moved relatively so that the microscope lens 1031 can capture the whole imaging of the detection sample S.

Figure 8:
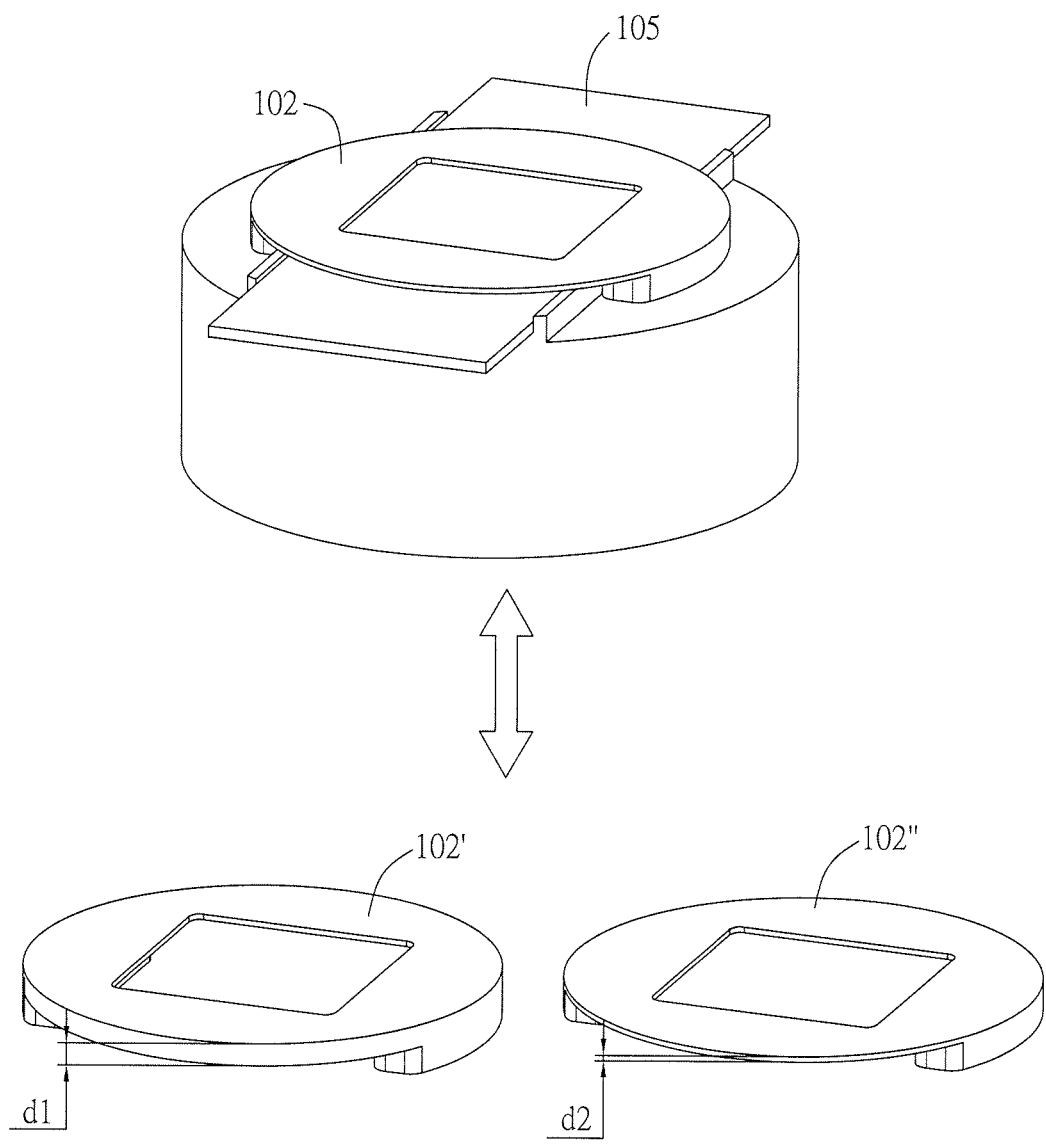
FIG. 8 is a schematic diagram (5) according to the embodiment of the invention.

Referring to FIG. 8, FIG. 8 is a schematic diagram (5) according to the embodiment of the invention. Please also referring to FIG. 5, in the embodiment, the magnification ratio of the microscope lens 1031 is constant. If the user want to observe at other magnification ratios and the single microscope lens 1031 is insufficient, the user can replace the microscope module 103 on demand and choose the cover (102', 102'') of adequate thickness (d1, d2) so that the microscope lens 1031 can be kept at optimized focal length.

Figure 9:
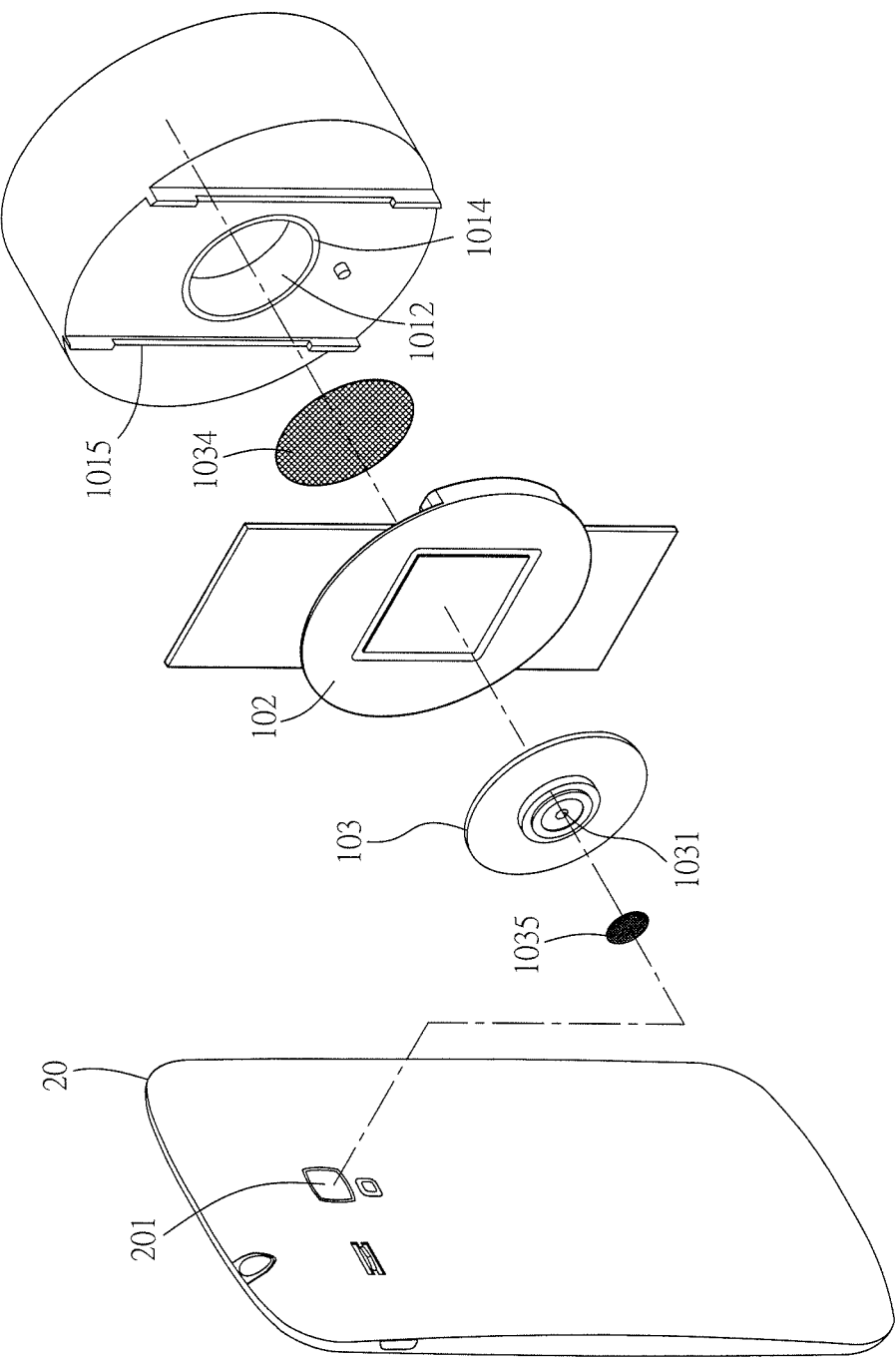
FIG. 9 shows another embodiment (1) according to the invention.

Referring to FIG. 9, FIG. 9 shows another embodiment (1) according to the invention. In the embodiment, the microscope module 103 has a first polarizer film 1034 and a second polarizer film 1035. The first polarizer film 1034 is disposed between the illumination module 105 of the base 101 and the detection sample S (the detection sample S can refer to FIG. 4, the illumination module 105 can refer to FIG. 3). Namely, the first polarizer film 1034 is disposed within the base 101 and between the illumination module 105 and the microscope slide 104. The second polarizer film 1035 is disposed between the detection sample S and the image capture module 201. FIG. 9 shows that the second polarizer film 1035 is disposed between the microscope module 103 and the image capture module 201 for example, and the second polarizer film 1035 is disposed at the side where the camera lens of the microscope module 103 faces the image capture module 201. In other embodiments, the second polarizer film 1035 can be also disposed between the detection sample S (the microscope slide 104) and the cover 102, or disposed between the cover 102 and the microscope module 103, and it is not limited thereto.

For example, the first polarizer film 1034 and the second polarizer film 1035 are linear polarizer film and respectively disposed on two sides of the detection sample S. When the illumination source L (please also referring to FIG. 5) is emitted from the base 101, it passes through the first polarizer film 1034, the detection sample S (the microscope slide 104), the microscope module 103 and the second polarizer film 1035 in sequence, and up to the image capture module 201 to form an image. The first polarizer film 1034 and the second polarizer film 1035 each has a polarization axis. Thus, by adjusting the relative positions of the polarization axes of the first polarizer film 1034 and the second polarizer film 1035 with rotation, the quantity of the illumination source L entering the image capture module 201 is accordingly adjusted so that lights at different polarized angles irradiate the detection sample S. Therefore, the resolution of the image is enhanced due to the first polarizer film 1034 and the second polarizer film 1035. As to adjustment of relative positions of the first polarizer film 1034 and the second polarizer film 1035, because the second polarizer film 1035 in the embodiment is disposed on the microscope module 103, the microscope module 103 can be fixed to the smart communication device 20, and when the cover 102 rotates with respect to the smart communication device 20 as shown in FIG. 9, the first polarizer film 1034 accordingly rotates with respect to the second polarizer film 1035 so that lights at different polarized angles can irradiate the detection sample S. In other embodiments, the second polarizer film 1035 can be directly disposed on the image capture module 201, and it is not limited thereto.

Figure 10:
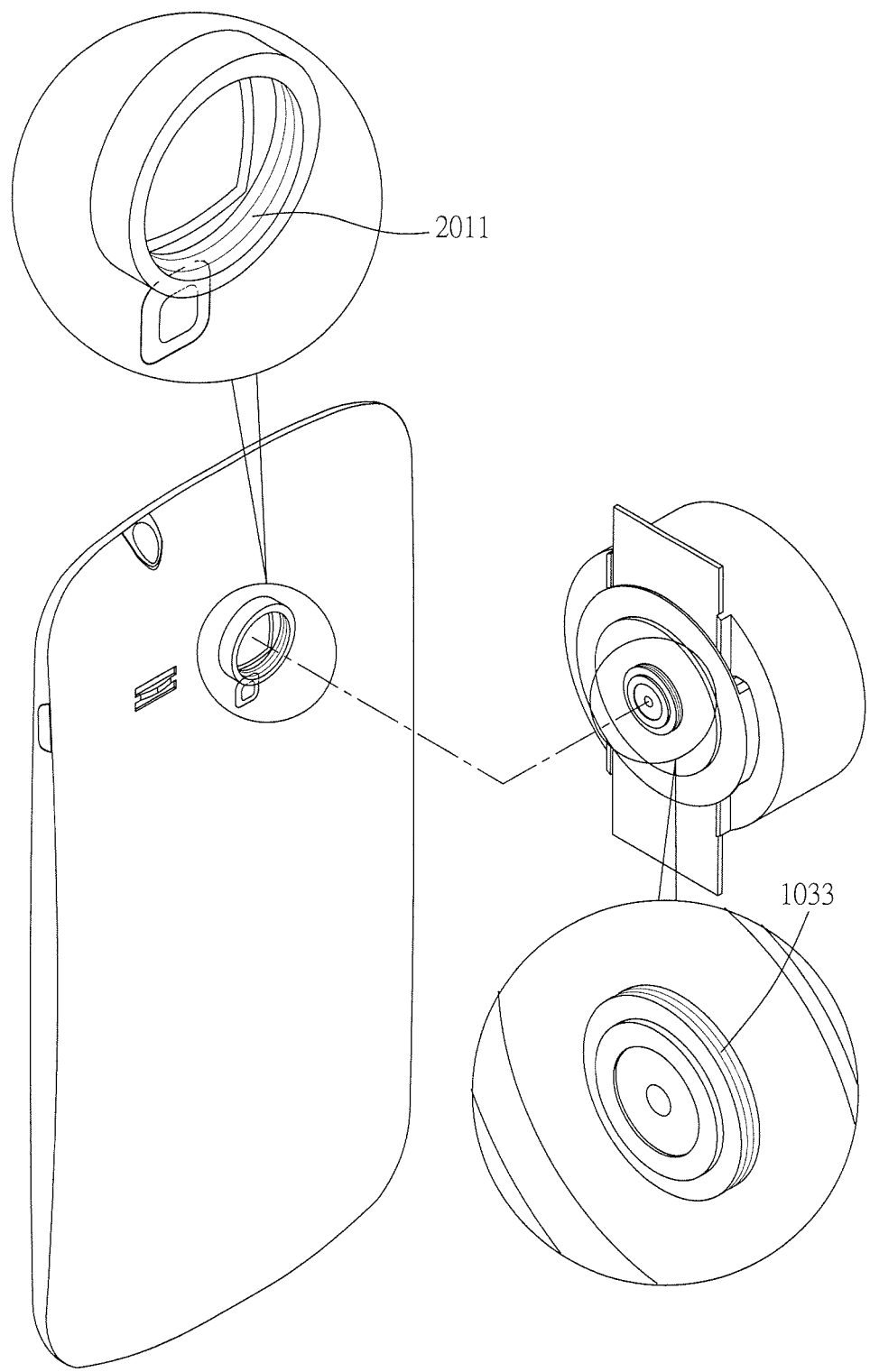
FIG. 10 shows another embodiment (2) according to the invention.

Referring to FIG. 10, FIG. 10 shows another embodiment (2) according to the invention. Please also referring to FIG.

6, in the embodiment, the microscope module 103 is fixed to the smart communication device 20 by screw thread so the microscope module 103 can be tightly secured on the smart communication device 20. In the figure, a screw thread portion 1033 is formed on the outer edge of the microscope lens 1031 of the microscope module 103. Furthermore, the image capture module 201 of the smart communication device 20 is also formed with a relative screw thread portion 2011. When assembling the microscope module 103 and the image capture module 201, the screw thread portion 1033 of the microscope module 103 is screwed to the relative screw thread portion 2011 or the image capture module 201, so the microscope module 103 can be tightly secured on the smart communication device 20.

Figure 11:
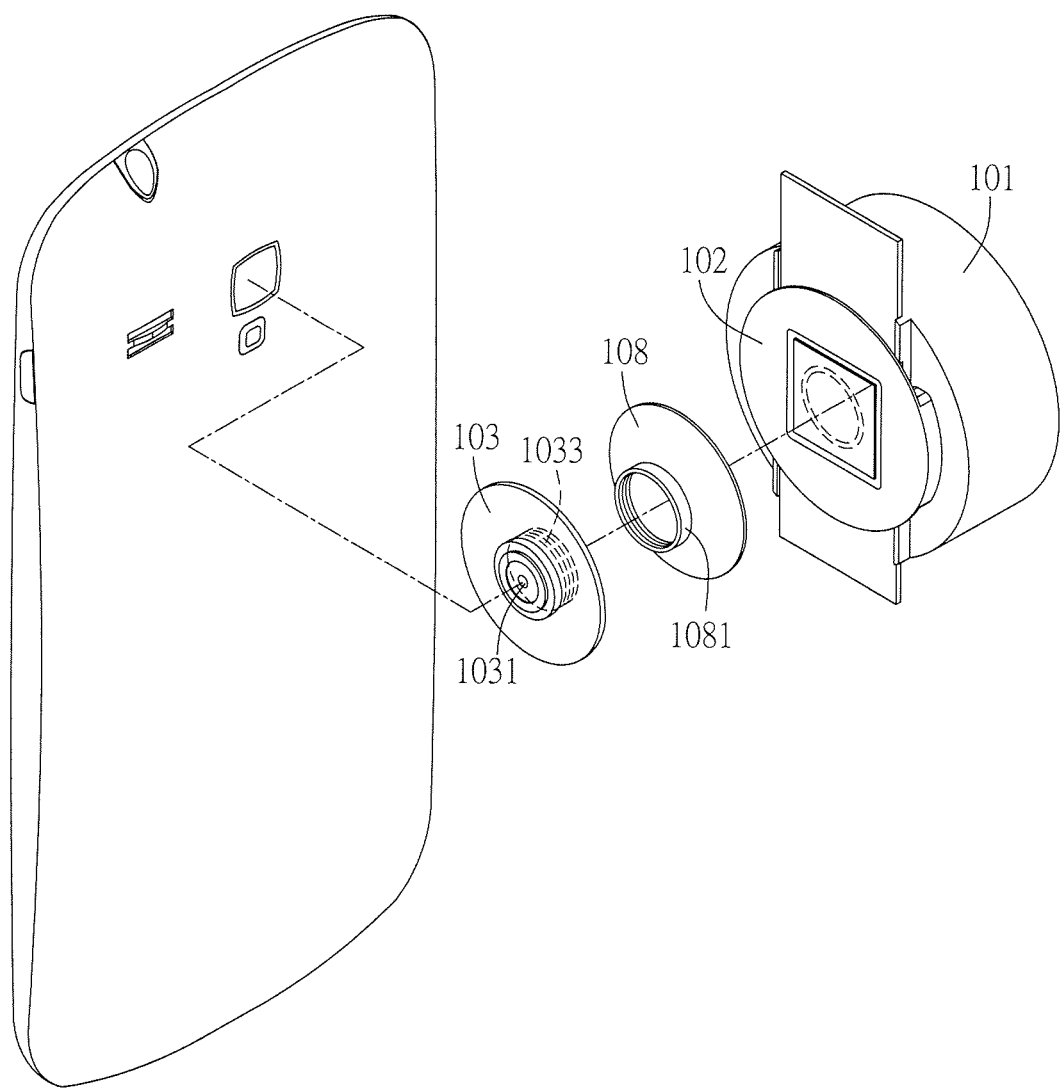
FIG. 11 shows another embodiment (3) according to the invention.

Referring to FIG. 11, FIG. 11 shows another embodiment (3) according to the invention. Because the magnification ratio of the microscope lens 1031 is constant, the focal length of the microscope lens 1031 is also constant. If the user want to substitute the microscope lens 1031 of other magnification ratios or the user finds that the distance between the detection sample S and the microscope lens 1031 is insufficient due to other reasons, the distance between the microscope lens 1031 and the detection sample S (the detection sample S can refer to FIG. 4) or the distance between the microscope lens 1031 and the cover 102 must be adjusted. In the embodiment, a structure 108 can be disposed between the microscope module 103 and the cover 102. As shown in FIG. 11 for example, the structure 108 in the embodiment can be a cover structure to increase or decrease the distance between the detection sample S and the microscope lens 1031. In detail, the structure 108 is disposed between the microscope module 103 and the cover 102. In the embodiment, a screw thread portion 1033 is disposed on a surface of the microscope module 103 facing the structure 108, the structure 108 has a relative screw thread portion 1082 on a surface of the structure 108 closer to the microscope lens 1031 so as to screw the screw thread portion 1033 of the microscope module 103. Namely, in the embodiment, the structure 108 and the microscope module 103 are fixed by screwing. Alternatively in other embodiment, wedging or other manners to fix also can be applicable and it is not limited thereto. In the embodiment, the screw thread can be properly designed to precisely adjust the distance between the microscope lens 1031 and the detection sample S. Thus, even though the user substitutes the microscope lens 1031 of different magnification ratio, the detection sample S is still located at the adequate focal length of the microscope lens 1031.

Figure 12:
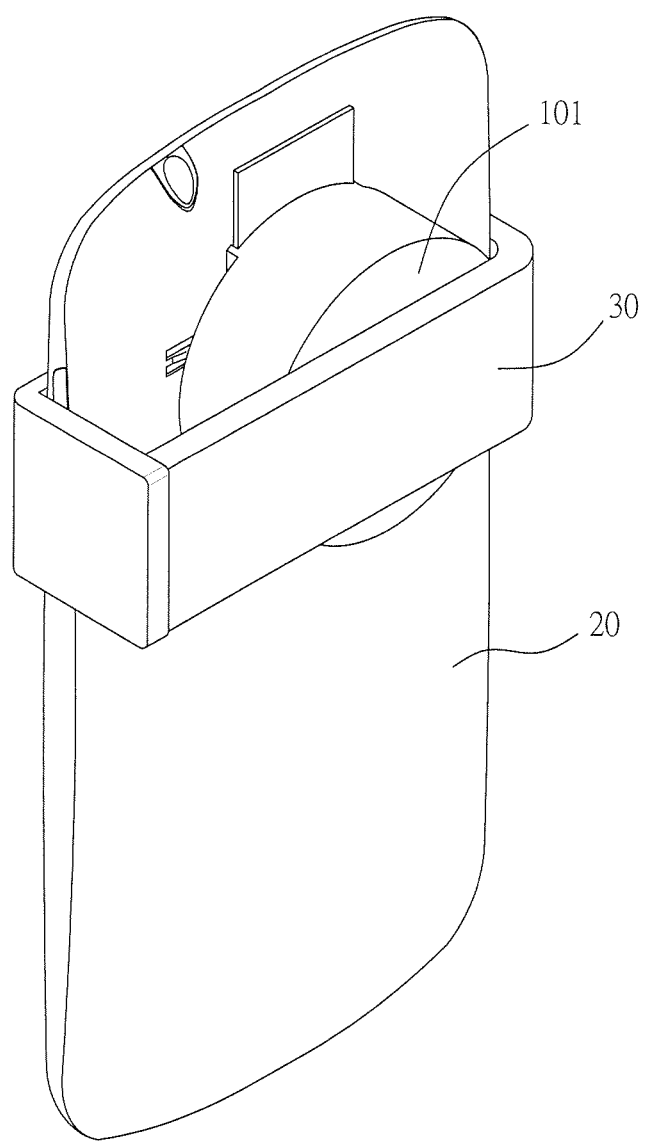
FIG. 12 shows another embodiment (4) according to the invention.

Referring to FIG. 12, FIG. 12 shows another embodiment (4) according to the invention. In the embodiment, when using the portable microscope device 10, it cooperates with the smart communication device 20. The portable microscope device 10 and the smart communication device 20 are fixed by magnetic force. For better fixing both, in the embodiment, a stationary fixture 30 is installed on the base 101. During using, the stationary fixture 30 can clamp two sides of the smart communication device 20 to fix the base 101 with the smart communication device 20. Moreover, in the embodiment, clamping is utilized, but any structure which can fix the base 101 to the smart communication device 20 for example clamping only by one side, attracting by magnetic force, fixing by sucker, or wedging structure, etc. is also applicable and not limited to.

Figure 13:
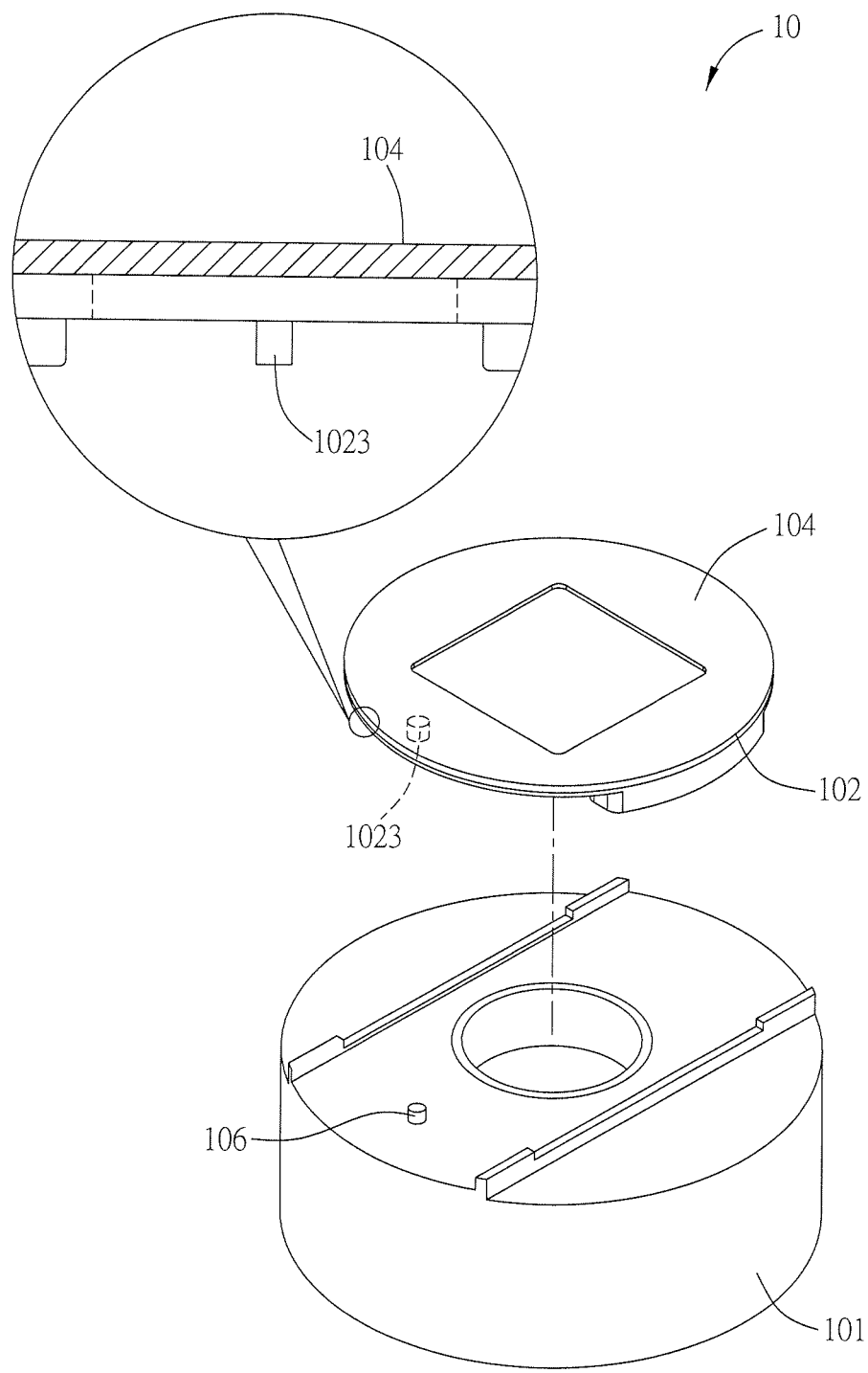
FIG. 13 shows another embodiment (5) according to the invention.

Referring to FIG. 13, FIG. 13 shows another embodiment (5) according to the invention. In the portable microscope device 10 in the embodiment, the microscope slide 104 can be installed at one side of the cover 102, or alternatively the microscope slide 104 can be embedded into the hollow portion 1021 of the cover 102, or alternatively the cover 102 is made by transparent material and acts as the microscope slide 104. However, it is not limited thereto. In the figure, in the embodiment, the microscope slide 104 is installed at one side of the cover 102. Accordingly, in the embodiment, the user can dispose the detection sample S (not shown in the figure) on the microscope slide 104 on the cover 102 and cover it with a coverslip, and then the user can observe the detection sample S. Therefore, in the embodiment, the microscope slide 104 is directly installed on the cover 102, accordingly the user can use the microscope slide 104 less time. Please referring to the figure again, a protrusion 1023 is installed on the other side of the cover 102. If the cover 102 is fixed to the base 101, the protrusion 1023 on the cover 102 can accordingly actualize the switch module 106.

As mentioned above, the portable microscope device includes a base, a cover and a microscope module. A detection sample is disposed on a microscope slide on the base beforehand, and then the cover is fixed to the base to complete the preparation before the examination. The user can install the microscope module on a communication device, and align a microscope lens of the microscope module with an image capture module of the communication device. During examination, the microscope module of the communication device is disposed on the cover, the microscope module can be attracted to a ring-shaped magnetic element of the base, and the microscope module and the base can move relatively to each other so as to move the base or the communication device. Accordingly, the communication device can capture the whole imaging of the detection sample. Moreover, a relative assembling portion of the cover adequately distances the microscope module distances from the microscope slide so that the microscope lens is located at the optimized focal length to observe the detection sample. If the microscope lens is replaced, the corresponding cover can be chosen to keep the focal length of the microscope lens optimized. Therefore, according to the embodiment of the invention, the portable microscope device can cooperate with a communication device, the microscope lens can be replaced on demand, and the position of the sample to be observed can be adjusted on demand during operation.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable microscope device, for cooperating with a communication device capable of capturing image and utilizing an image capture module of the communication device to capture an image of a detection sample on a microscope slide, comprising:

a base, comprising an illumination module within the base;

a cover, replaceably and directly without any intermediaries and magnetically attracted to the base without a hinge, wherein the cover is capable of being completely removed from the base;

a microscope module, having a microscope lens replaceably installed on the cover to enable the image capture module of the communication device to capture the image of the detection sample by the microscope lens, wherein the microscope slide is installed in the cover, and the cover directly without any intermediaries contacts the base to form a space to accommodate the slide between the cover and the base when the cover is installed on the base.

2. The portable microscope device of claim 1, wherein the base includes a detective portion, and a magnetic attraction portion is installed on the periphery of the detective portion, a relative magnetic attraction portion of the microscope module is attracted to the magnetic attraction portion to enable the microscope module and the cover to relatively move under the condition that they are not separated.

3. The portable microscope device of claim 2, wherein when the relative magnetic attraction portion of the microscope module is attracted to the magnetic attraction portion, the illumination module accordingly generates an illumination source to the detection sample.

4. The portable microscope device of claim 1, wherein the base has a restrictive groove on an upper plane thereof for a microscope slide disposed in the restrictive groove.

5. The portable microscope device of claim 1, wherein the cover is made by transparent material.

6. The portable microscope device of claim 1, wherein the base has a detective portion at the top thereof.

7. The portable microscope device of claim 6, wherein a power module is installed on the bottom of the base, the illumination module corresponds to the detective portion, the power module is electrically connected to the illumination module, and a switch module is installed on the base to control the power module to drive the illumination module.

8. The portable microscope device of claim 7, wherein the switch module is pressed to actuate by the microscope slide to drive the illumination module to work.

9. The portable microscope device of claim 7, wherein the switch module is pressed to actuate by the cover to drive the illumination module to work.

10. The portable microscope device of claim 1, wherein the illumination module has an illumination source of invisible light or an illumination source of ultraviolet.

11. The portable microscope device of claim 1, wherein a screw thread portion is formed on the periphery of the microscope lens to relatively screw to a relative screw thread portion of the image capture module.

12. The portable microscope device of claim 1, wherein a stationary fixture is installed on the base to clamp the communication device.

13. The portable microscope device of claim 1, wherein the microscope module has a first polarizer film and a second polarizer film, the first polarizer film is disposed between the illumination module of the base and the detection sample, and the second polarizer film is disposed between the detection sample and the image capture module.

14. The portable microscope device of claim 1, wherein the microscope module is fixed on the image capture module, and the communication device is a smart phone.

15. The portable microscope device of claim 1, wherein with a thickness of the cover, the microscope lens is kept at an optimized focal length to observe the detection sample on the microscope slide.

16. The portable microscope device of claim 1, wherein the base comprises:
a detective portion;
two magnetic attraction portions, apart from each other and installed on the periphery of the detective portion, wherein the space is between the magnetic attraction portions;
two restrictive portions, apart from each other on an upper plane of the base and between the magnetic attraction portions;
wherein the cover comprises two relative assembling portions protruding toward the base, and the microscope module comprises two relative magnetic attraction portions,
wherein the relative assembling portions of the cover align the restrictive portions and directly without any intermediaries contact the base by magnetic attraction, wherein the relative magnetic attraction portions of the microscope module, the relative assembling portions of the cover and the magnetic attraction portions of the base are magnetically attracted together, so as to fix the cover between the microscope module and the base and to enable the microscope module and the cover to relatively move under the condition that they are not separated, and so as to form the space to accommodate the slide between the relative assembling portions, the cover and the base, wherein the microscope slide passes through the space along the restrictive portions.

17. A portable microscope device, for cooperating with a communication device capable of capturing image and utilizing an image capture module of the communication device to capture an image of a detection sample on a microscope slide, comprising:
a base comprising:
a detective portion; and
two magnetic attraction portions, apart from each other and installed on the periphery of the detective portion;
a cover, replaceably and directly without any intermediaries contacting the base;
a microscope module, comprising two relative magnetic attraction portions and a microscope lens replaceably installed on the cover to enable the image capture module of the communication device to capture the image of the detection sample by the microscope lens,
wherein two relative magnetic attraction portions of the microscope module are magnetically attracted to the magnetic attraction portions of the base, so as to fix the cover between the microscope module and the base and to enable the microscope module and the cover to relatively move under the condition that they are not separated, and so as to form a space to accommodate the slide between the cover and the base when the cover is installed on the base.

18. The portable microscope device of claim 17, wherein the cover is directly without any intermediaries and magnetically attracted to the base without a hinge and capable of being completely removed from the base, wherein the microscope module, the cover and the magnetic attraction portions of the base are magnetically attracted together.

19. A portable microscope device, for cooperating with a communication device capable of capturing image and utilizing an image capture module of the communication device to capture an image of a detection sample on a microscope slide, comprising:
a base comprising:
two restrictive portions, apart from each other on an upper plane of the base;
a cover, replaceably and directly without any intermediaries contacting on the base, wherein the cover comprises:
two relative assembling portions, protruding toward the base;
a microscope module, having a microscope lens replaceably installed on the cover to enable the image capture module of the communication device to capture the image of the detection sample by the microscope lens, wherein the relative assembling portions align the restrictive portions and directly without any intermediaries contacts the base so as to form a space to accommodate the slide between the relative assembling portions, the cover and the base, wherein the microscope slide passes through the space along the restrictive portions, wherein the cover is directly without any intermediaries and magnetically attracted to the base without a hinge and capable of being completely removed from the base, wherein the microscope module, the cover and the base are magnetically attracted together.

* * * * *